United States Patent
Gordon et al.

(10) Patent No.: US 8,014,565 B2
(45) Date of Patent: Sep. 6, 2011

(54) LABELING USED IN MOTION CAPTURE (75) Inventors: Demian Gordon, Culver City, CA (US); Dennis J. Hauck, Jr., Hermosa Beach, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 176 days.

(21) Appl. No.: 11/467,503

(22) Filed: Aug. 25, 2006

(65) Prior Publication Data

US 2007/0200854 A1   Aug. 30, 2007

Related U.S. Application Data (60) Provisional application No. 60/712,082, filed on Aug. 26, 2005, provisional application No. 60/711,968, filed on Aug. 26, 2005, provisional application No. 60/711,848, filed on Aug. 26, 2005.

(51) Int. Cl.
  G06K 9/00 (2006.01)
  G06K 9/46 (2006.01)
  G06K 9/42 (2006.01)
  H04N 5/225 (2006.01)
  G06T 13/00 (2011.01)

(52) U.S. Cl. ........ 382/103; 382/107; 382/190; 382/259; 348/169; 345/473

(58) Field of Classification Search .................. 382/107, 382/103, 190, 259; 348/169; 345/473
See application file for complete search history.

(56) References Cited

U.S. PATENT DOCUMENTS

| | | | |
|---|---|---|---|
| 5,550,928 A * | 8/1996 | Lu et al. ........................ | 382/116 |
| 5,845,009 A | 12/1998 | Marks et al. | |
| 5,930,379 A | 7/1999 | Rehg et al. | |
| 6,061,644 A | 5/2000 | Leis | |
| 6,144,366 A | 11/2000 | Numazaki et al. | |
| 6,236,737 B1 | 5/2001 | Gregson et al. | |
| 6,606,412 B1 | 8/2003 | Echigo et al. | |
| 6,697,502 B2 | 2/2004 | Luo | |
| 7,092,569 B1 * | 8/2006 | Kinjo ............................ | 382/190 |
| 7,184,047 B1 * | 2/2007 | Crampton ..................... | 345/473 |
| 2004/0005004 A1 * | 1/2004 | Demos ..................... | 375/240.08 |
| 2004/0063481 A1 | 4/2004 | Wang | |
| 2006/0055699 A1 | 3/2006 | Perlman et al. | |
| 2007/0102636 A1 | 5/2007 | Boyer et al. | |

OTHER PUBLICATIONS

Schuldt et al, "Recognizing Human Actions: A Local SVM Approach." 2004 IEEE, pp. 1-5.*
International Search Report and Written Opinion issued in PCT/US06/33711 on Feb. 29, 2008.

(Continued)

*Primary Examiner* — Kathleen S Dulaney
(74) *Attorney, Agent, or Firm* — Samuel S. Lee; Procopio, Cory, Hargreaves & Savitch LLP (57) ABSTRACT

Labeling motion capture volume data includes: receiving a motion capture beat, the motion capture beat including unlabeled body points and unlabeled face points; labeling the unlabeled body points which have a valid fit to a predetermined body model template; verifying the labeled body points using stretch analysis; labeling unlabeled body points using a kinematic skeleton analysis; isolating the unlabeled face points; stabilizing the unlabeled face points; labeling the unlabeled face points; and merging the labeled face points and labeled body points.

12 Claims, 10 Drawing Sheets

OTHER PUBLICATIONS

Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.

L. Herda et al., "Using Skelton-Based Tracking to Increase The Reliability of Optical Motion Capture", Human Movement Science, 2001. http://citeseer.ist.psu.edu/herda01using.html, figures 1a and 1b, abstract, and pp. 1-3 and 19.

Eftychios Sifakis et al., "Automatic Determination of Facial Muscle Activations From Sparse Motion Capture Marker Data", ACM Transactions of Graphics (TOG), v. 24 N. 3, Jul. 2005, figure 1.

Franco, J.-S., et al., "A Distributed Approach for Real Time 3D Modeling", In Proceedings of the IEEE Workshop on Real Time 3D Sensors and Their Use. 2004.

Office Action issued in U.S. Appl. No. 11/467,506 on Sep. 18, 2008.

Office Action issued in U.S. Appl. No. 11/467,494 on Sep. 10, 2009.

* cited by examiner

Stretch Check

LABELING USED IN MOTION CAPTURE

CROSS-REFERENCE TO RELATED APPLICATIONS

This application claims the benefit of priority of co-pending U.S. Provisional Patent Application No. 60/712,082, filed Aug. 26, 2005, entitled "LABELING RENDER FARM USED IN MOTION CAPTURE," U.S. Provisional Patent Application No. 60/711,968, filed Aug. 26, 2005, entitled "RELATIVE LABELING," and U.S. Provisional Patent Application No. 60/711,848, filed Aug. 26, 2005, entitled "BODY CONSTRAINT SYSTEM IN MOTION CAPTURE." The disclosures of the above-referenced patent applications are hereby incorporated by reference.

BACKGROUND

The present invention relates generally to motion capture, and more particularly, to labeling data points generated by motion capture.

Motion capture ("MOCAP") systems are used to capture the movement of a real object and map it onto a computer-generated object. Such systems are often used in the production of motion pictures and video games for creating a digital representation of a person for use as source data to generate a computer graphics ("CG") animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations and orientations (e.g., as spatial coordinates) of the markers on the actor in each frame. By tracking the locations of the markers, the system generates a spatial representation of the markers over time and builds a digital representation of the actor in motion. The motion is then applied to a digital model, which may then be textured and rendered to produce a complete CG representation of the actor and/or performance. This technique has been used by special effects companies to produce realistic animations in many popular movies.

Tracking the locations of markers, however, is a difficult task. The difficulties compound when a large number of markers is used, and multiple actors populate a motion capture space.

Implementations of the present invention provide for a labeling system for labeling motion capture data points for improved identification.

In one implementation, a motion capture labeling system comprises: a body labeling module configured to receive motion capture data and to generate labeled body data, the motion capture data including unlabeled body data and unlabeled face data; and a relative labeling module configured to receive motion capture volume data, to generate labeled face data, and to generate labeled motion capture volume data including the labeled body data and the labeled face data.

In another implementation, the motion capture labeling system further comprises: a body modeling module, a stretch check module, a kinematic skeleton module, and a relative labeling module.

In another implementation, a method of motion capture labeling comprises: receiving a motion capture beat, the motion capture beat including unlabeled body points and unlabeled face points; creating labeled body points by labeling the unlabeled body points which have a valid fit to a predetermined body model template; verifying the labeled body points using a stretch analysis; creating additional labeled body points by labeling unlabeled body points using a kinematic skeleton analysis; isolating the unlabeled face points; stabilizing the unlabeled face points; labeling the unlabeled face points; and merging the labeled face points and labeled body points.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Images captured by motion capture cameras of markers coupled to actors are used in reconstruction to generate 3-D volumes in which a "point" represents a marker. Capturing the motion of points in the 3-D volume requires identifying the points in the sequence of frames comprising the shot (also referred to as a motion capture "beat"). However, most of the points are often indistinguishable. Labeling the points provides identification information which aids in determining the motion of each point.

Accordingly, implementations of the present invention is describe systems and methods for labeling used in motion capture including descriptions of a body labeling module and a relative labeling module (e.g., for labeling a face). Thus, the labeling system can run on face and/or body data. The labeling system specifies who the actors are in the beat, what to call the various files that are output, where to save those files, and which processes have already been run on the beat. In one implementation, the labeling system used in motion capture receives information from a motion capture database.

After reading this description it will become apparent to one skilled in the art how to implement the invention in various alternative implementations and applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
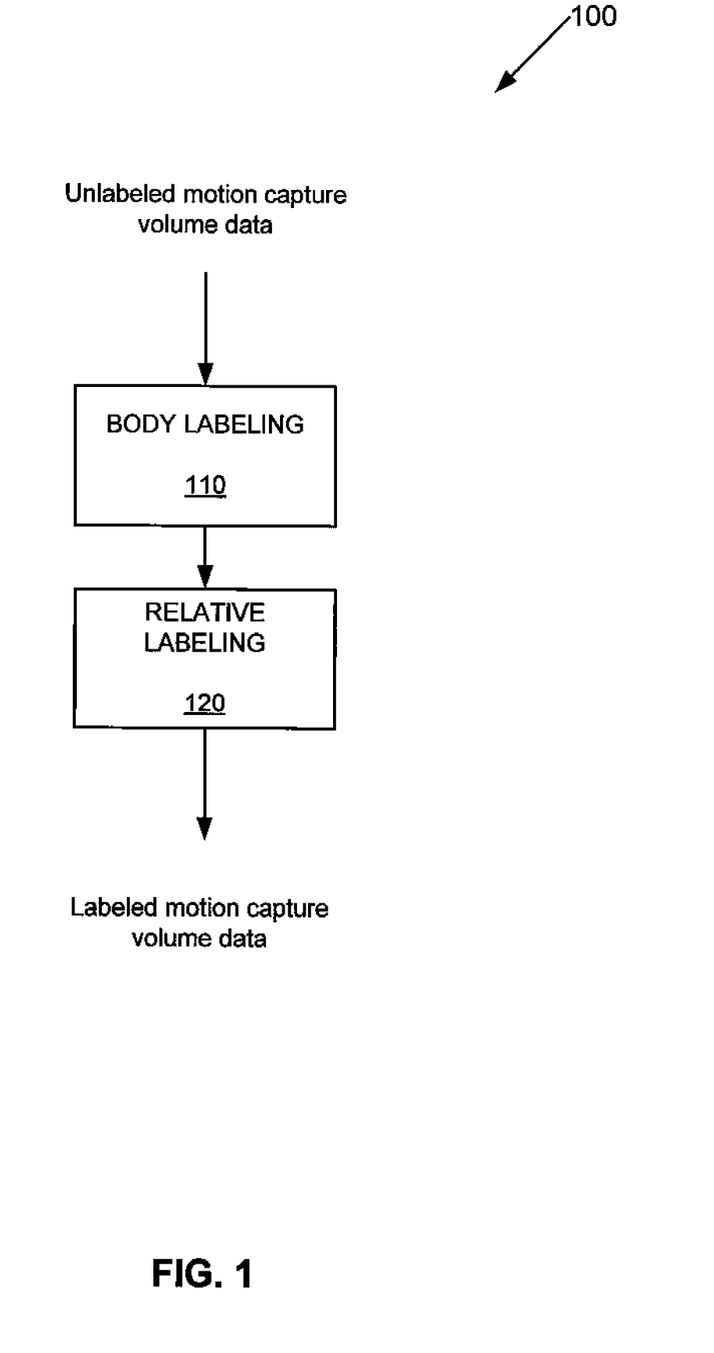
FIG. 1 is a functional block diagram depicting an example labeling system that may be used in connection with various implementations described herein.

FIG. 1 is a block diagram illustrating a labeling system 100 used in motion capture. The labeling system 100 includes a body labeling module 110 and a relative labeling module 120. In one implementation, use of the body modeling module 110 is optional. In another implementation, use of the relative labeling module 120 is optional.

In the illustrated implementation of FIG. 1, the labeling system 100 receives motion capture volume data, which includes points in 3-D space usually generated by a reconstruction system from original motion capture camera images. As described above, the labeling system 100 can specify who the actors are in the beat (i.e., the motion capture shot), what to name the various files that are output, where to save those files, and which processes have been executed on the beat. In another implementation, the labeling system 100 queries and updates a motion capture database (not shown).

The body labeling module 110 receives motion capture volume data including unlabeled body data, and outputs motion capture volume data including labeled body data. The body modeling module 110 maintains body model templates of poses for an actor, discarding poses that are very similar, and keeping only unique poses. Many poses are derived from those included in a full range of motion ("ROM"), a series of movements performed by the actor at the beginning of a motion capture beat. The body modeling module also builds a constraint space for valid relationships between body points. The body modeling module 110 can normalize incoming poses of the same actor from different day's beats, before adding the new and unique poses. As used herein, "body data" and "body points" both refer to "point clouds" associated with an actor's body. Moreover, "body" data include data representing almost any figure or object having one or more components, moving or stationary.

The relative labeling module 120 receives motion capture volume data including labeled body data and unlabeled face data from the body labeling module 110, and outputs labeled motion capture volume data including labeled face data. In one implementation, the relative labeling module 120 labels data pertaining to a face, or head, which are merged with the labeled body data. In another implementation, the relative labeling module 120 can be extended to label other parts of the body (including hand motion capture) for 3-D reconstruction and labeling.

The relative labeling module 120 is typically used prior to reconstruction (see U.S. Provisional Patent Application Ser. No. 60/711,971, filed Aug. 26, 2005, entitled "RECONSTRUCTION RENDER FARM USED IN MOTION CAPTURE") to threshold out facial markers. Thus, only the body markers to be considered by the labeling system are given reconstructions.

Figure 2:
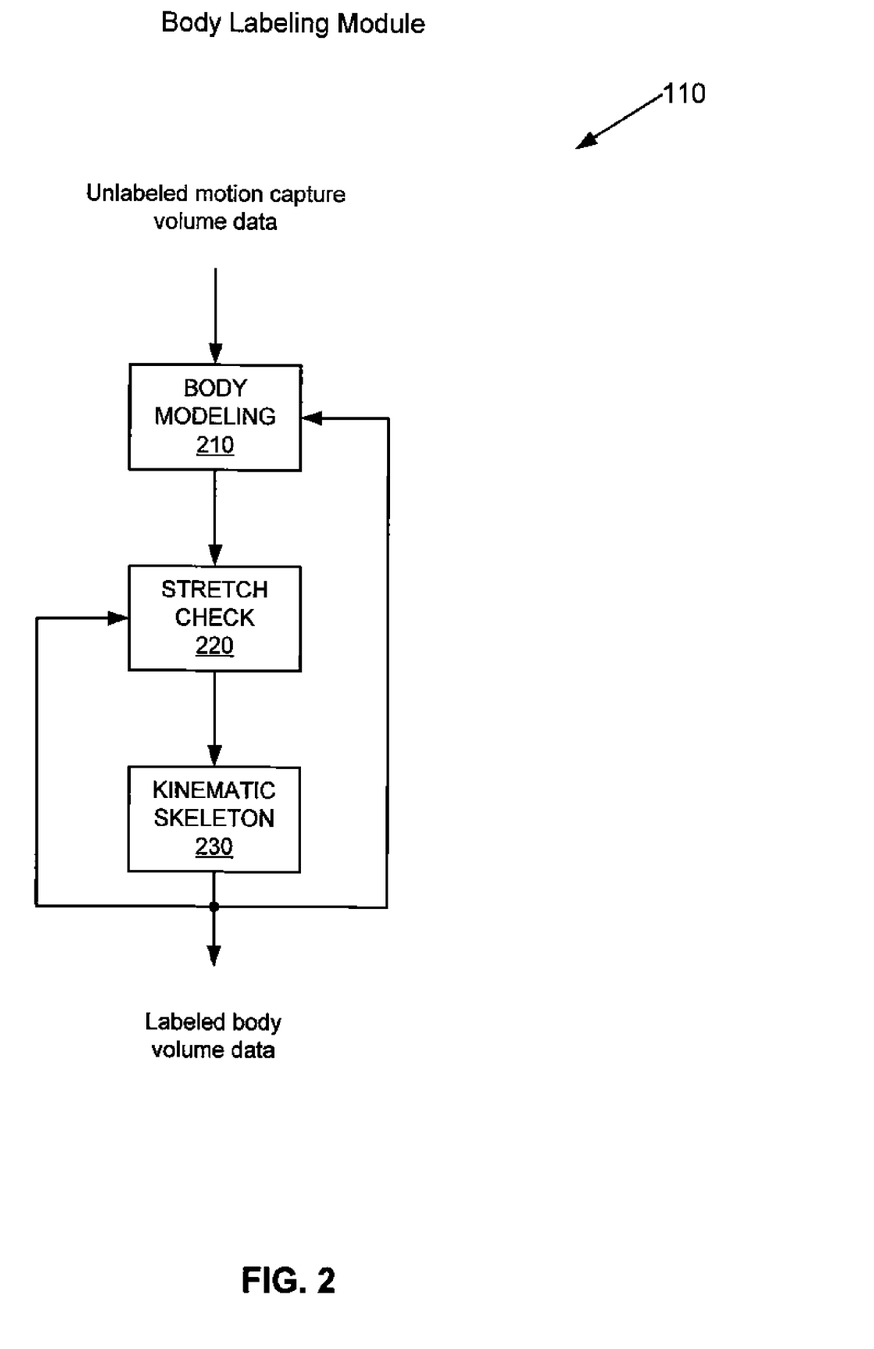
FIG. 2 is a functional block diagram depicting an example body labeling module that may be used in connection with various implementations described herein.

FIG. 2 is a block diagram illustrating the body labeling module 110 used in motion capture. The body labeling module 110 includes a body modeling module 210, a stretch check module 220, and a kinematic skeleton module 230.

The body modeling module 210 receives unlabeled motion capture volume data, and generates tagged frames with labeled body points. The input unlabeled motion capture volume data comprise a beat, which includes a sequence of data frames. Each frame represents a 3-D volume with points representing markers.

In one implementation, the body modeling module 210 scans each frame of the beat and fits the unlabeled body data to predetermined body model templates. When a valid fit is found, the associated frame is tagged and the body points in the tagged frame are labeled. Individual points that are not part of an otherwise valid fit are deemed extraneous or erroneous, and therefore unusable. The output of the body modeling module 210 comprises the tagged and untagged frames of the beat. The tagged frames are often interspersed in the frame sequence and referred to as "keyframes." Untagged frames between the keyframes constitute gaps.

The stretch check module 220 receives keyframes and untagged frames from the body modeling module 210. The stretch check module 220 uses an actor's body model to determine valid stretch (and rigidity) values for body data and removes any invalidly stretching markers. The stretch check module analyzes only the body data of the keyframes to verify that moving markers (i.e., points) are moving in a valid manner. The gap frames between the keyframes are not analyzed at this stage. The stretch check module 220 also de-labels any labeled points that fail stretch analysis (i.e., that are moving invalidly). The stretch check module 220 outputs the keyframes and gap frames comprising the beat, where the keyframes have verified/labeled body points, and possibly de-labeled points.

The stretch check module 220 also provides "near time" (i.e., "near real-time") analysis and knowledge of how markers stretch over time. The near time capability assists tracking when other markers in the volume are used for props and set scene layout. Such markers exhibit little stretch and can therefore be located using stretch analysis. They can then be eliminated, or ignored by not labeling them. In one implementation, a file of labeled points can be retrieved and a stretch check executed with it.

The kinematic skeleton module 230 receives frames comprising the beat, including keyframes and gap frames, from the stretch check module 220. The kinematic skeleton module 230 uses various parameters (as described below) including a modeled skeleton, velocity prediction, knowledge of valid joint angles, and constraint spaces in the actor's body model to label the body points of the beat frames. In one implementation, the kinematic skeleton module 230 interpolates the motion of the skeleton between the keyframes to aid in estimating its position and velocity in the intervening gap frames. The body points can then be labeled according to their spatial and kinematic relationships to the skeleton.

The kinematic skeleton module 230 outputs labeled body volume data including keyframes having "cleaned," verified body points, and intervening gap frames having body points newly labeled (at the kinematic skeleton module 230) but not yet verified (at the stretch check module 220). These output frames are passed back to the stretch check module 220. At the stretch check module 220, all the frames are analyzed, and body points are either verified or de-labeled. The resulting frames, now with verified, labeled body points, are then passed to the kinematic skeleton module 230.

When the kinematic skeleton module 230 executes on the beat again, markers that were de-labeled by the stretch check module 220 on particular frames after the first execution of the kinematic skeleton module 230 are not allowed to be labeled the same way as they were previously labeled in the same frames.

After each beat is completed and verified as properly labeled throughout, the result is added to the body model to make it more robust. Accordingly, in one implementation, cleaned, labeled body volume data output by the kinematic skeleton module 230 are passed back to the body modeling module 210. New poses can be derived from these frames of cleaned, labeled body points, and used at the body modeling module 210 to update and add to available body model templates. An actor's body model becomes more robust with every pose added. Less hand tracking is likely to occur as each new beat is completed, analyzed, and new poses are added to the body model templates for that actor.

In one particular implementation, a master body model is built by compiling an actor's body model and normalizing the master body model. Substantially duplicated poses can then be culled. In another particular implementation, a depth of field analysis is performed as an aid to removing markers (points) extraneous to a particular body. Prior to body labeling at the body labeling module 110, 3-D reconstruction (not shown) is provided with instructions to ignore 2-D marker images that are small and close to the camera. As an example, 4-5 mm facial markers are substantially smaller in physical size than 19 mm body markers, but it is difficult to determine in a motion capture image whether a small marker image is a facial marker close up or a body marker farther away. Camera rays projecting through the marker images in the beat are used according to rules disallowing short camera rays with a small circle size (i.e., discarding facial markers that are close to the camera), and allowing long camera rays with small circle size (i.e., retaining body markers that are far away from the camera). Removing undesired markers during reconstruction can significantly simplify the task of labeling desired markers at the labeling system 100.

Figure 3:
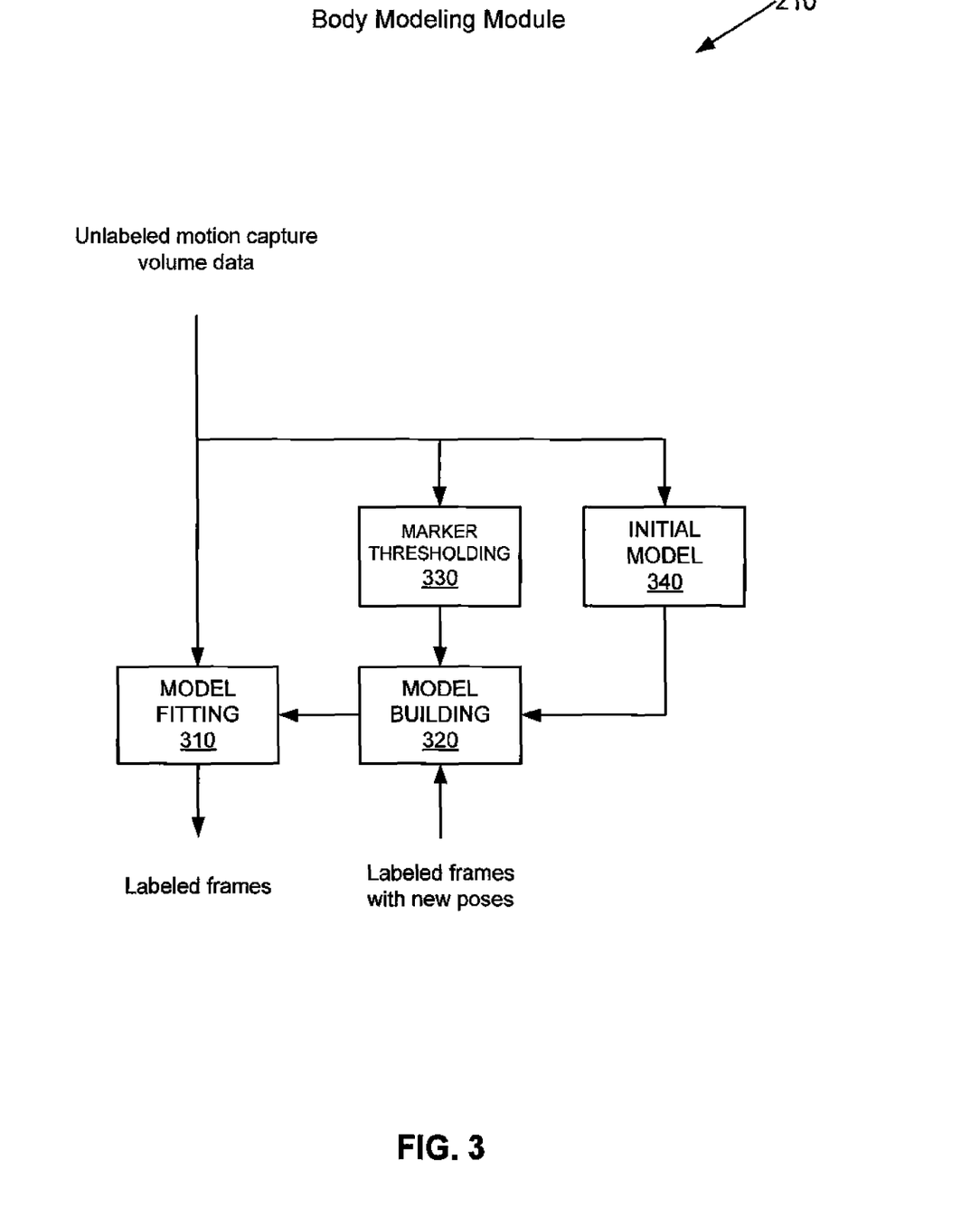
FIG. 3 is a functional block diagram depicting an example body modeling module that may be used in connection with various implementations described herein.

FIG. 3 is a block diagram illustrating a body modeling module 210 that may be used in motion capture. The body modeling module 210 includes a model fitting module 310, a model building module 320, a marker thresholding module 330, and an initial model module 340.

In the illustrated implementation of FIG. 3, the model fitting module 310 receives an input beat comprising unlabeled motion capture volume data and body model templates associated with actors in the scene that are captured in the input beat. The model fitting module 310 outputs tagged frames with labeled body points.

In one implementation, body data represented as unlabeled point clouds are initially identified by hand-labeling three markers. To discriminate between three actors, for example, the three markers can be placed in unique patterns. The three markers can be placed on the head (for facial) or the waist (for body). Alternatively, if the markers are not hand labeled, then an active marker system can be used to generate the coordinate system that is used for stabilization. Once a coordinate system is known that is moving locally (relative to the rest of the information that is to be labeled), then for each object in the scene that is to be relatively labeled, a version of the entire file is saved. Active markers include LEDs, RF tags, sonic chirp devices, magnetic sensors and inertial guidance sensors. Additionally, passive markers with unique characteristics can be used, including glow-in-the-dark and shaped markers.

In another implementation, the points representing an actor are isolated from the rest of the points in the volume. A copy is made of the unlabeled motion capture volume data. Within the copy, a sphere is formed about the points of the actor, and all points outside of the sphere are removed. The labeling then proceeds on the copy with the single actor of interest.

Once an actor has been identified in the scene, body model templates for that actor are received by the model fitting module 310. In one implementation, a body model template includes constraint spaces describing valid relationships between the markers that drive a bone and the offsets, distances, and stretches of the markers in relation to that bone when the body is in different poses (e.g., at different joint angles). The model fitting module 310 runs through each frame of the volume data and fits the body points of the actor to the templates until a best match is found. In another implementation, a skeleton for the actor is included in the body model templates and applied to the body points until a best fit is obtained. When a best fit is obtained for the body points in a particular frame, the frame is tagged and the body points are labeled. If a best fit is not obtained, then the model fitting module 310 proceeds to the next frame.

The model building module 320 receives body model templates and frames of motion capture volume data with labeled body points, and outputs body model templates. Body model templates include cleaned and labeled body points and skeletons, as well as other information. The frames of labeled body data for an actor are analyzed automatically for new and unique poses not already represented by a body model template, and adds any that are found. In one implementation, the model building module 320 is able to normalize poses of the same actor from beats captured on different days before adding the new poses to the body model templates. In another implementation, the model building module 320 discards poses that are very similar, keeping only unique poses.

The marker thresholding module 330 receives the unlabeled motion capture volume data and outputs body model templates, which include rigidity thresholds (see FIG. 4) for each body marker, and which can be used to describe constraint spaces as discussed above in relation to the model fitting module 310.

The initial model module 340 receives unlabeled motion capture volume data, and generates frames including labeled, and cleaned body points. In one implementation, each actor executes, at the beginning of each beat, a range of motions and poses called a "full range of motion" ("full ROM"). A full ROM includes known poses such as, for example, a T-form pose ("$T_{pose}$"). The initial model module 340 is used to derive body model templates that capture the range of poses included in the full ROM. In another implementation, the initial model module 340 provides facilities to set up a master skeleton manually to rough degrees of freedom ("DOFs"). Frames of the full ROM are selected and the master skeleton is fitted and scaled in the frames to an actor's body points to become the "actor skeleton" for that actor. The actor skeleton definitions and DOFs are kept with the actor body model templates. The actor skeleton can "learn" further DOFs from other body model templates for that actor.

The initial model module 340 can be used to manually label and fully clean the full ROM (remove all extraneous points) to generate frames of labeled body points suitable in developing an initial set of body model templates. The marker thresholding module 330 can be used to generate body model templates using the leftover frames of the full ROM that were not selected at the initial model module 340 for manual fitting to DOFs.

Figure 4:
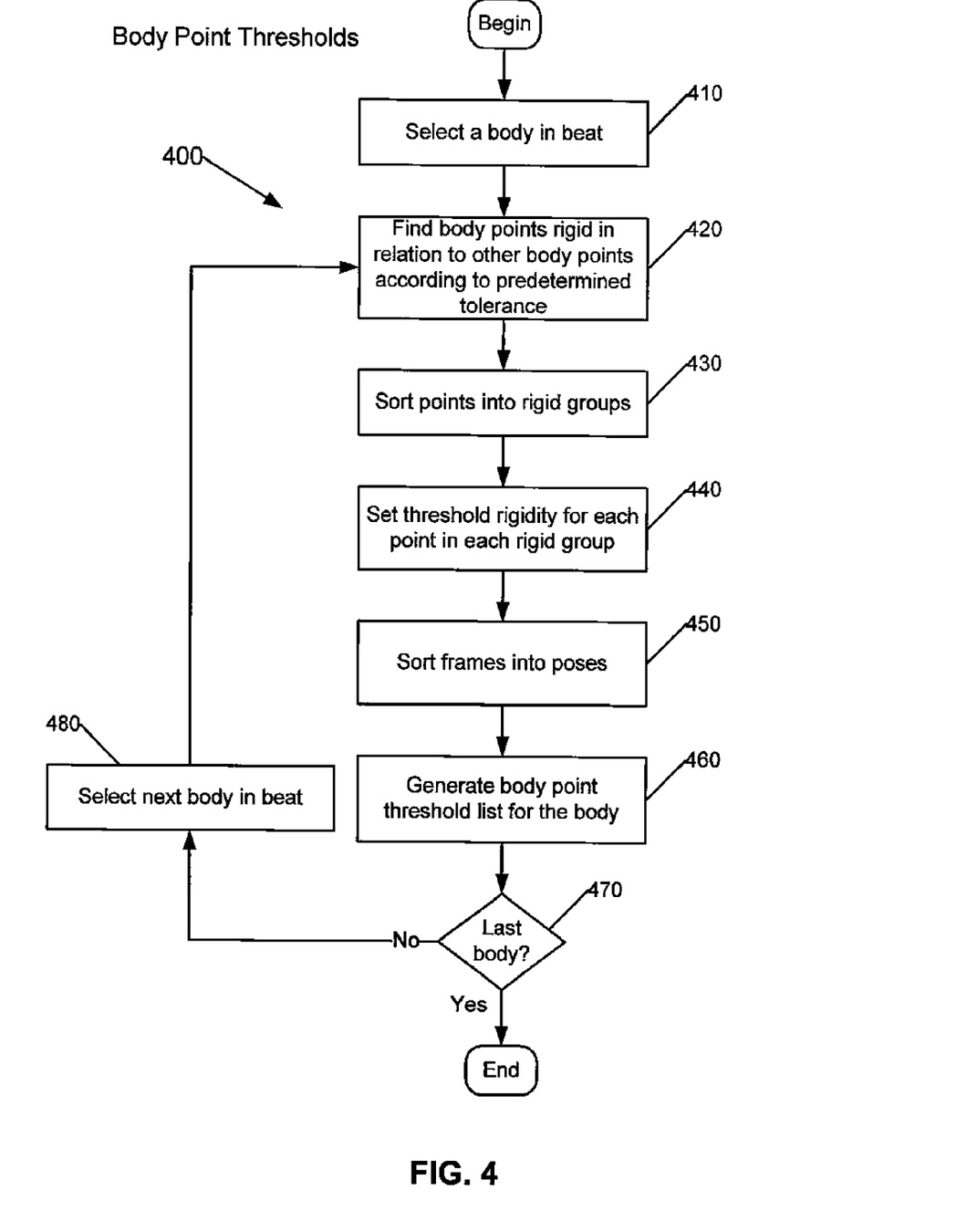
FIG. 4 is a flowchart depicting an example method of determining marker thresholds that may be used in connection with various implementations described herein.

FIG. 4 is a flowchart illustrating a method 400 of determining marker thresholds that may be used in connection with various implementations described herein. In one implementation, the method described in FIG. 4 is used in the marker thresholding module 330 (see FIG. 3), which receives the unlabeled motion capture volume data. This unlabeled motion capture volume data includes a sequence of 3-D volume frames including body points representing one or more actors.

A body is selected in the frame sequence, at 410. Selection may be aided by the use of unique marker patterns and active markers. Rigidity of the body points of the body in relation to each other is determined over time (i.e., over a span of frames). Body points that are "rigid" according to a predetermined tolerance are found, at 420. The rigid body points are sorted into "rigid groups," at 430. In one implementation, the rigid groups correspond to portions of body limbs, such as forearms and upper arms. A threshold rigidity for each body point in each rigid group is set, at 440. This provides a stretch limit for body points analyzed in other frames and poses in determining whether the body point belongs to a particular rigid group.

The frames are sorted into poses, at 450. For example, a relatively wide range of poses is encountered when frames from the initial full ROM are analyzed. Various frames are sorted out as being representative of the unique poses. A body point threshold list is generated for the body, at 460. The body point threshold list is incorporated with and becomes part of the body model template for the body. In one implementation, the body point threshold list is saved to a file which is associated with the body model template. In another implementation, body point rigidity thresholds are initial values that may be adjusted later. A determination is made as to whether the last body in the beat has been analyzed, at 470. If the beat has not been analyzed, then the next body in the frame sequence is selected, at 480, and the method continues at 420. If the beat has been analyzed, at 470, the method ends.

Figure 5:
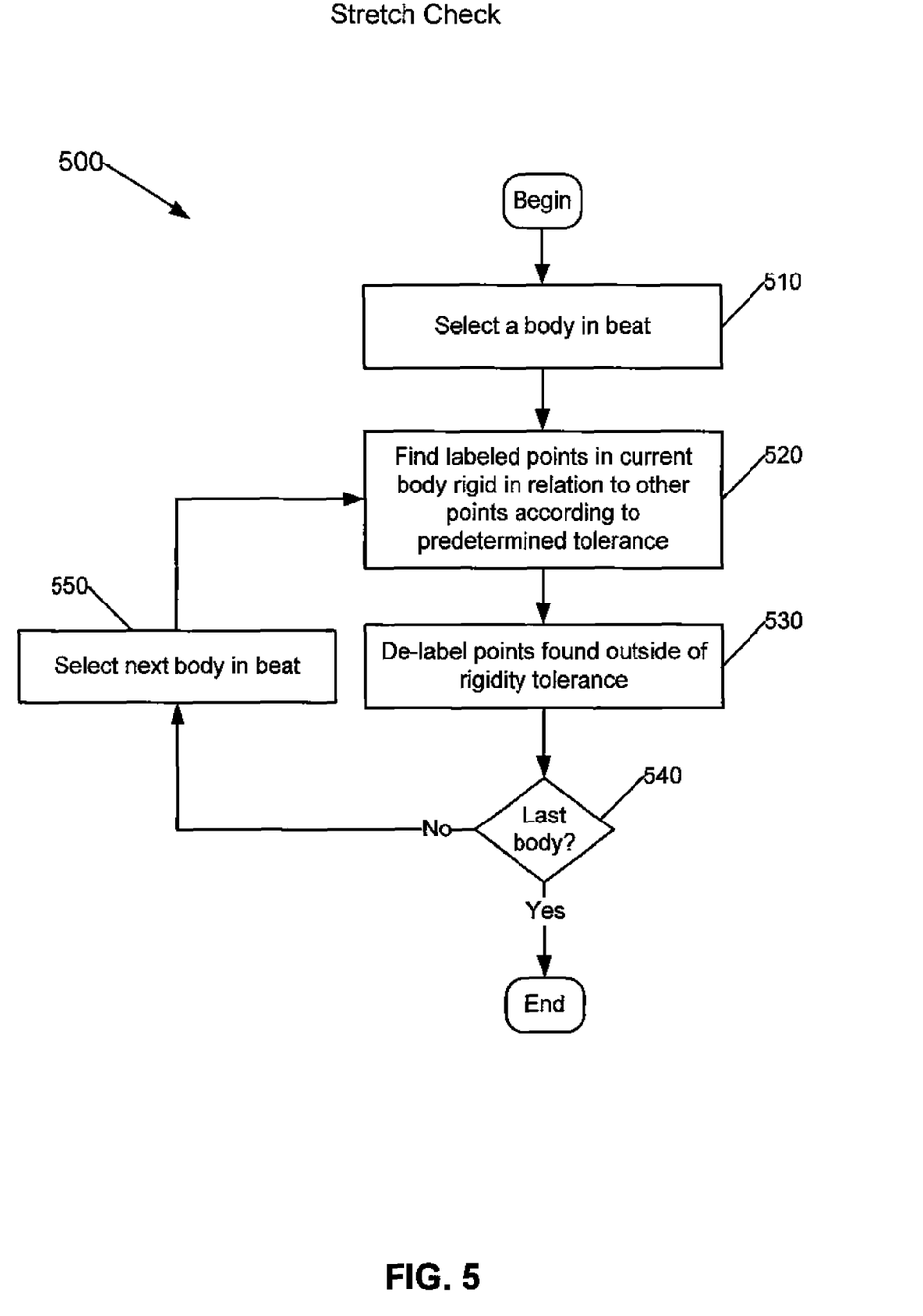
FIG. 5 is a flowchart depicting an example method of performing a stretch check that may be used in connection with various implementations described herein.

FIG. 5 is a flowchart illustrating a method 500 of performing a stretch check that may be used in connection with various implementations described herein. In one implementation, the method 500 described in FIG. 5 is used in the stretch check module 220 (see FIG. 2).

A body represented by labeled body points is selected in the input beat, at 510. Rigidities of the body points relative to each other are determined over time (i.e., over a span of frames). For example, two body points of an actor's upper arm are significantly "rigid" in relation to each other, but both are less "rigid" in relation to a body point of the actor's forearm. However, any two body points of a common body component such as an upper arm are typically not absolutely rigid in relation to each other. Rigidity can therefore be described using a range of values, or, as in one implementation, by a predetermined tolerance. Accordingly, rigidities of labeled body points are determined according to a predetermined tolerance. Alternatively, the rigidity of labeled body points are determined against a stretch template derived from a previously determined body point threshold list. Body points determined to have sufficient rigidity are found, at 520.

Labeled body points found inside their rigidity tolerance are deemed "verified" body points. Labeled body points found outside their rigidity tolerance are instead de-labeled, at 530, which disassociates the body point from the particular body.

A determination is made as to whether the last body in the beat has been analyzed, at 540. If the last body has not been analyzed, a next body in the beat is selected, at 550, and the method continues at 520. If the last body has been analyzed at 540, the method ends.

Figure 6:
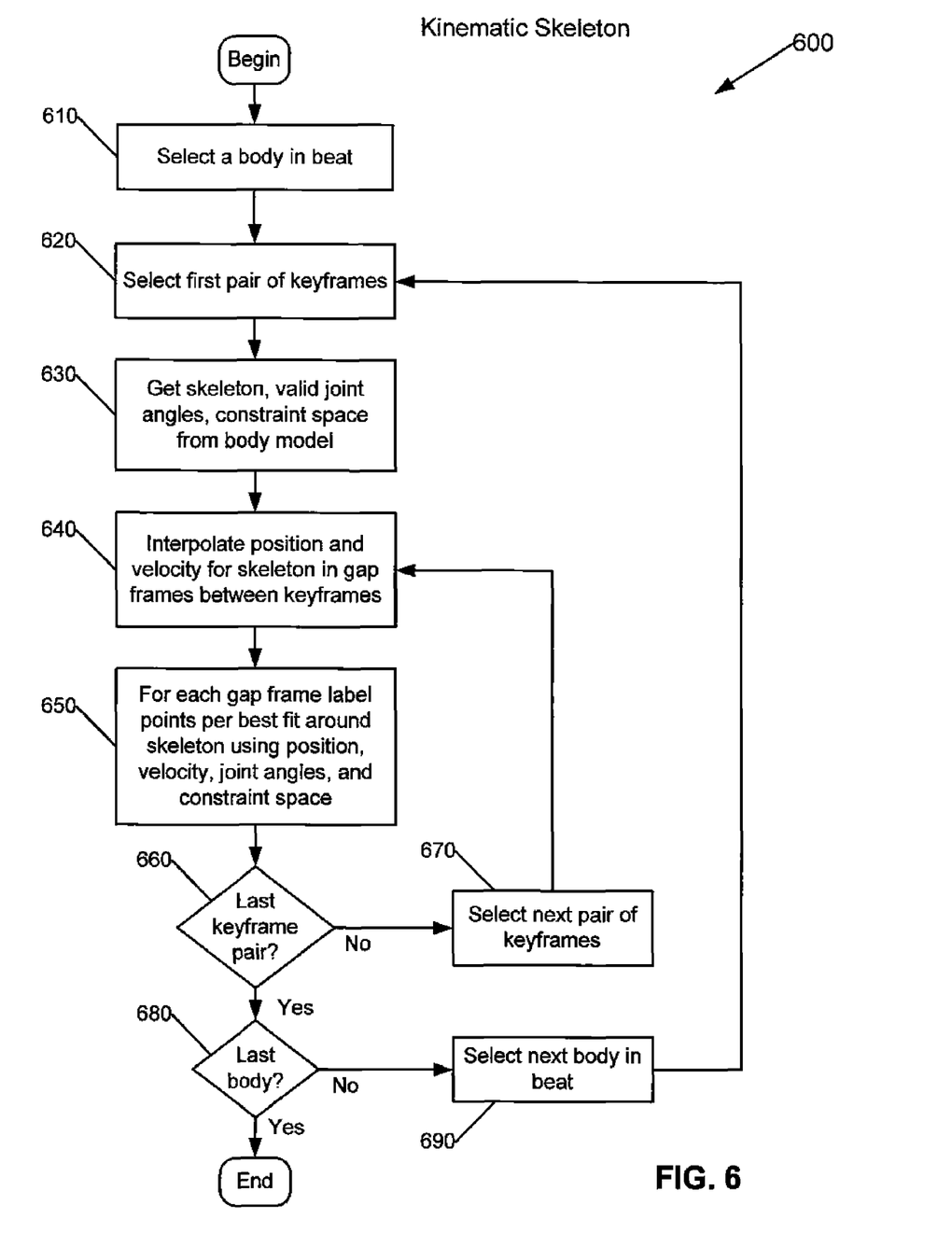
FIG. 6 is a flowchart depicting an example method of performing a kinematic skeleton analysis that may be used in connection with various implementations described herein.

FIG. 6 is a flowchart illustrating a method 600 of performing a kinematic skeleton analysis in accordance with one implementation. The method 600 described in FIG. 6 can be used in the kinematic skeleton module 230 (see FIG. 2). The kinematic skeleton module 230 receives a sequence of frames, some or all of which include verified, labeled body points.

Once a body in the beat is selected, at 610, a first pair of keyframes is selected, at 620. If the selected keyframes are adjacent frames in the frame sequence, then the next pair of keyframes is selected, and so on, until the selected pair has intervening gap frames that include unlabeled body points associated with the selected body.

In one implementation, a skeleton (e.g., actor skeleton), valid joint angles, and a constraint space are obtained from a body model template, at 630. Positions and velocities for the skeleton in the intervening gap frames are interpolated using the keyframe pair, at 640. In each intervening gap frame, body points for the selected body are fitted to the interpolated skeleton using position, velocity, valid joint angles, and the constraint space, at 650. A determination is made as to whether this is the last keyframe pair, at 660. If it is not the last keyframe pair, then a next pair of keyframes is selected, at 670, and the method continues at 640. If it is the last keyframe pair, a determination is made as to whether the body is the last body in the beat, at 680. If it is not the last body, then a next body is selected in the beat, and the method continues at 620. If it is the last body, then the method ends.

Figure 7:
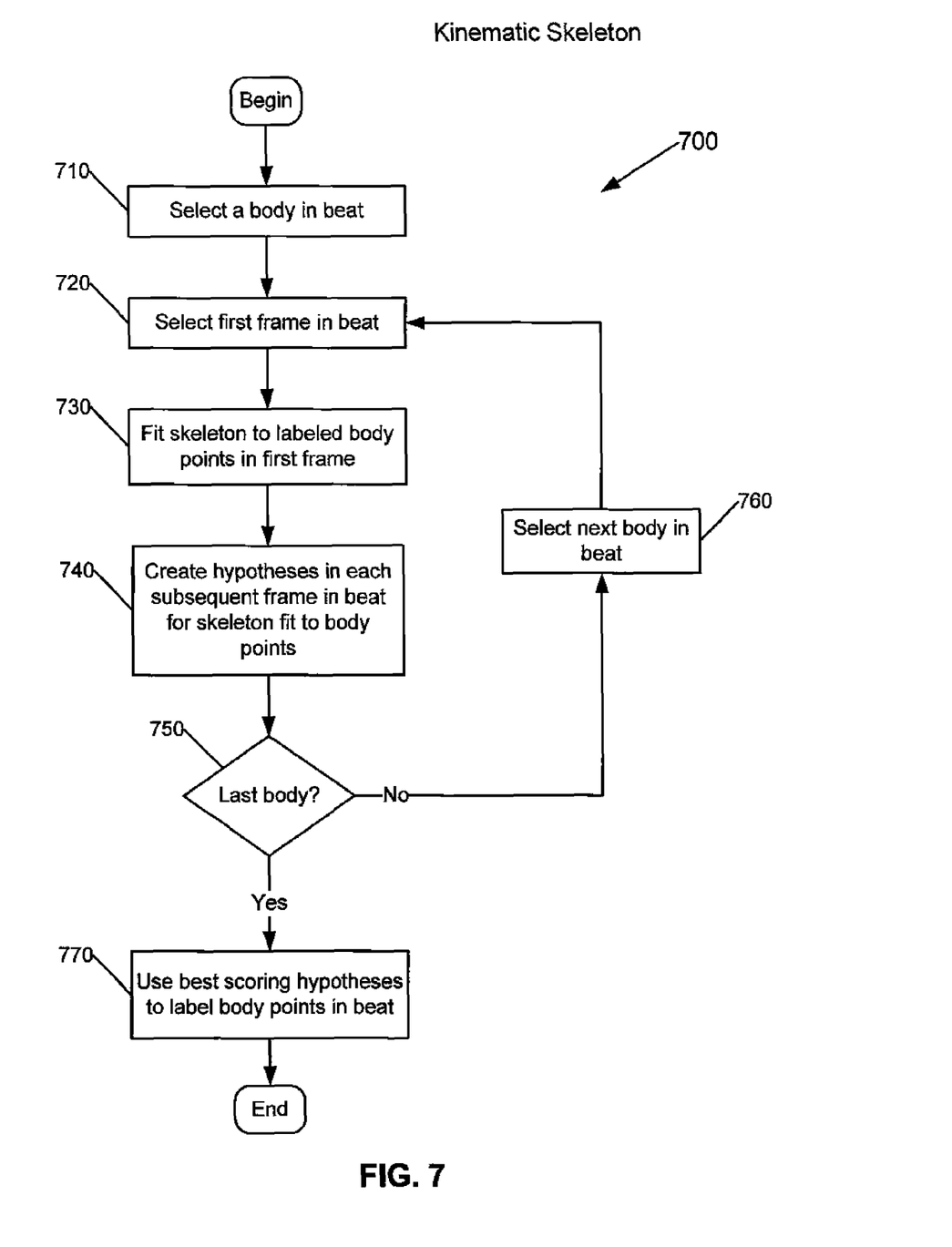
FIG. 7 is a flowchart depicting another example method of performing a kinematic skeleton analysis that may be used in connection with various implementations described herein.

FIG. 7 is a flowchart illustrating a method 700 of performing a kinematic skeleton analysis in accordance with another implementation. The method 700 described in FIG. 7 can be used in the kinematic skeleton module 230 (see FIG. 2). The kinematic skeleton module 230 receives a sequence of frames, some or all of which include verified, labeled body points.

Once a body in the beat is selected, at 710, the first frame in the beat is selected, at 720. A skeleton is fitted to the labeled body points in the first frame, at 730. In one implementation, the first frames of a beat include body points representing the actor performing a known pose such as, for example, a T-form pose ("$T_{pose}$"). In this case, the skeleton is fitted to the labeled body points comprising the known $T_{pose}$ in the first frame of the beat. Hypotheses are generated as to how best to fit the skeleton to the body points in each subsequent frame, at 740. Each hypothesized skeleton can be verified using inverse kinematics, and a least squares error is computed to "score" the hypothesis. In another implementation, frames including already labeled body points, such as keyframes, are used to reduce the errors of the hypotheses. The labeled body points of the keyframes provide known pose information much like an actor's $T_{pose}$ of the first frame. A determination is made as to whether the last body of the beat has been analyzed, at 750. If the last body has not been analyzed, then a next body is selected, at 760, and the method continues at 720. If the last body has been analyzed, the best scoring hypotheses are used to label body points in the beat, at 770.

When a skeleton cannot be used for labeling (which may happen because the marker data are very bad), then labeling of that frame is skipped. This is because wrongly labeled points propagate errors through subsequent frames.

Figure 8:
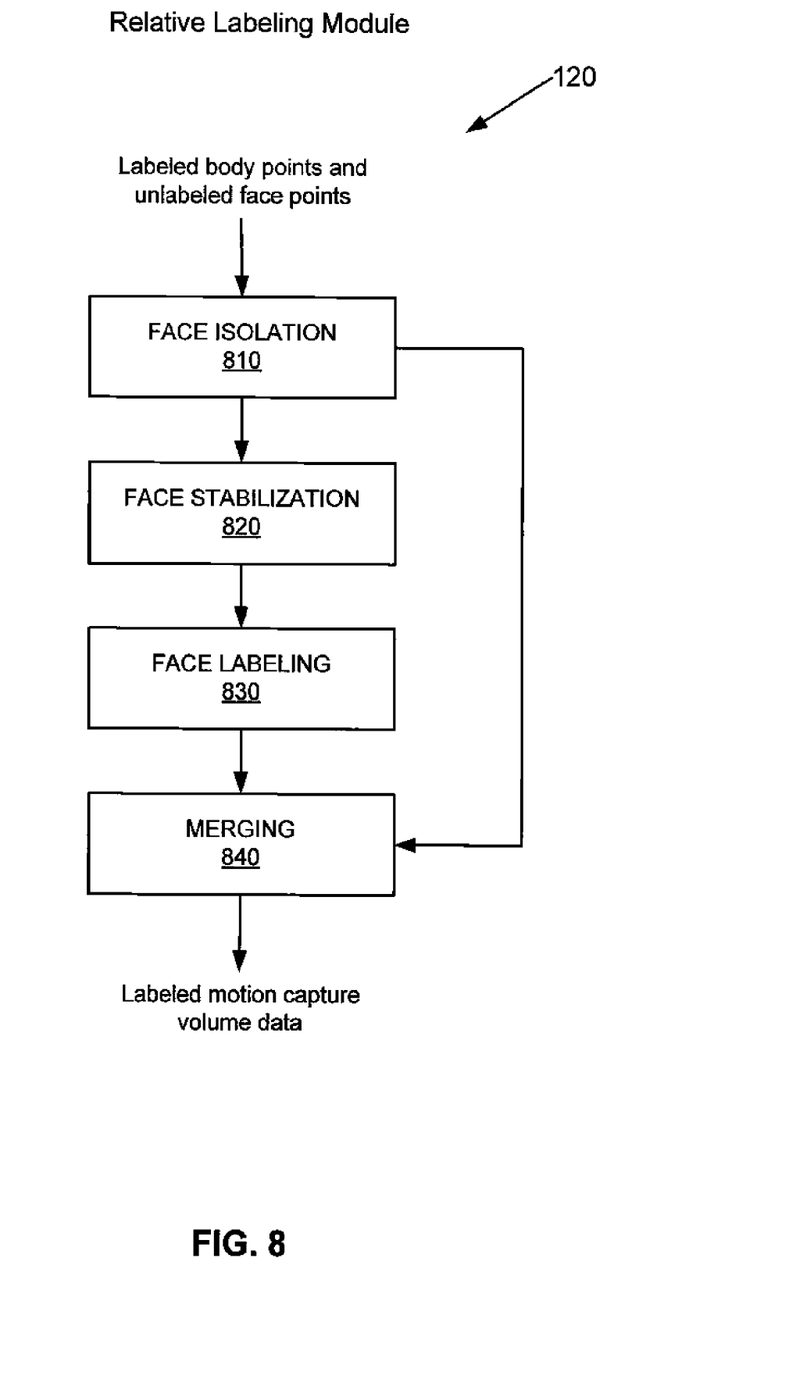
FIG. 8 is a functional block diagram depicting an example relative labeling module that may be used in connection with various implementations described herein.

FIG. 8 is a block diagram illustrating a relative labeling module 120 that may be used in connection with various implementations described herein. The relative labeling module 120 includes a face isolation module 810, a face stabilization module 820, a labeling module 830, and a merging module 840. The relative labeling module 120 receives a beat including frames of labeled body points and unlabeled face points. It will be appreciated, as discussed above, that 'body' points include any point data in 3-D representing a figure or object. "Face" points similarly include 3-D point data representing a figure or object. Further, relative labeling can be applied to unlabeled body points. A distinction between body and face data can be based on differences between the markers used for each. In one example, body markers are relatively large while face markers are smaller to capture subtler motions.

The face isolation module 810 receives labeled body points and unlabeled face points, and outputs unlabeled face points representing an actor's head, isolated from bodies and other actors, heads. For each actor in the beat, the face isolation module 810 separates the actor's labeled body points from the associated "head." The face isolation module 810 then isolates each head, including the unlabeled face points associated with it. In one implementation, the isolated head and unlabeled face points are saved into a file corresponding to the actor associated with the head.

The face stabilization module 820 receives unlabeled face points representing an actor's head, isolated from bodies and other actors' heads, and outputs the unlabeled face points stabilized in space. Thus, the face stabilization module 820 holds still the point cloud of face points representing the actor's head, which enables simplified labeling subsequently. In one implementation, in each of the saved files that includes an isolated head, the point cloud in the file is stabilized based on known relative information for the head. Known relative information includes, for example, the overall translational velocity of the actor's head in the scene. Accordingly, the face points are stabilized when the translational velocity is removed from the point cloud. This may be accomplished by subtracting the translational velocity from the kinematic states of the point cloud. In one implementation, the point cloud can include unlabeled body points. After stabilization, the actor in motion appears to be pinned at the torso.

Isolated and stabilized face points are received by the face labeling module 830, which outputs labeled face points. In one implementation, the labeling module 830 uses other automated labeling software.

The merging module 840 receives the labeled face points and labeled body points that were removed from the beat at the face isolation module 810. The merging module 840 merges the labeled face points with the labeled body points, producing the labeled motion capture volume data (the output beat). In one implementation, the merging may take place on a per actor basis, generating a separate output beat for each actor.

Figure 9:
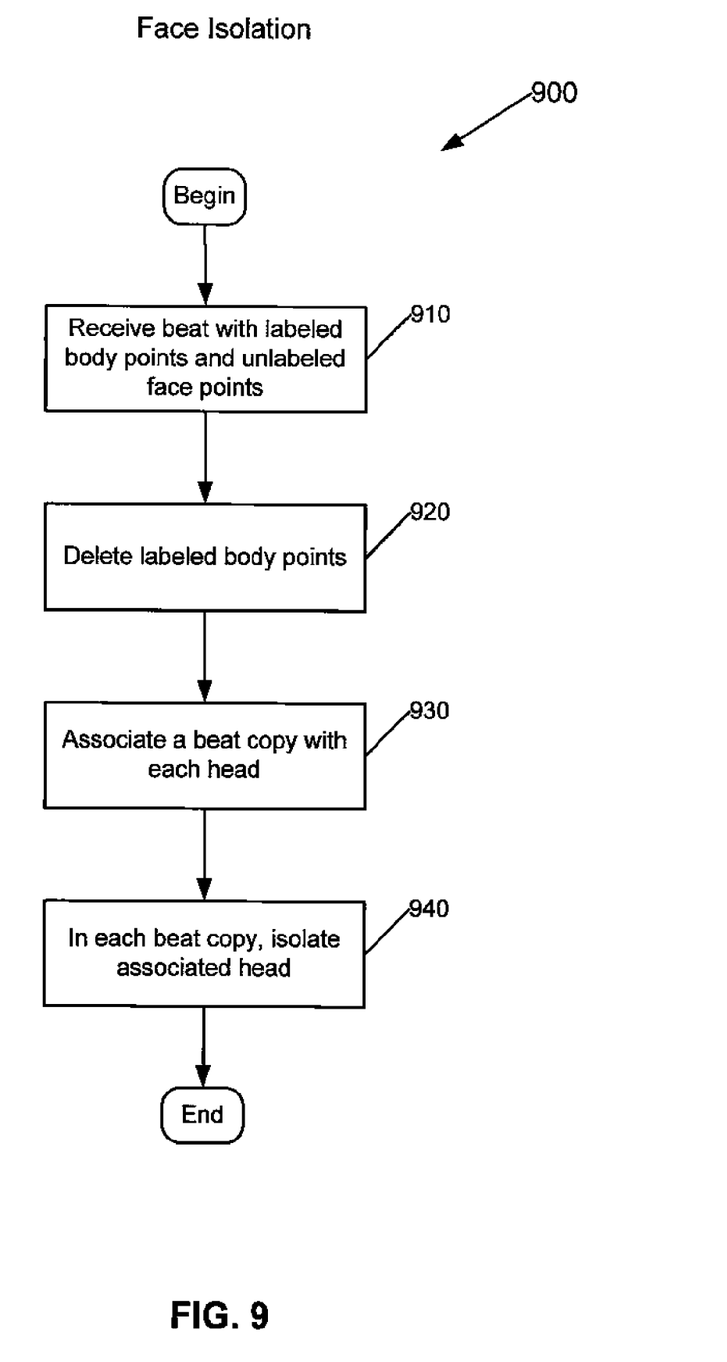
FIG. 9 is a flowchart depicting an example method of face isolation that may be used in connection with various implementations described herein.

FIG. 9 is a flowchart illustrating a method 900 of face isolation that may be used in connection with various implementations described herein. In one implementation, the method 900 described in FIG. 9 is used in the relative labeling module 120 (see FIG. 8).

A beat including labeled body points and unlabeled face points is received, at 910. Labeled body points are deleted from the beat, at 920, leaving unlabeled head points of the beat. A copy of the beat is then made for each head in the beat, at 930. One copy is associated with each actor's head.

In one implementation, to aid identification of the heads, a "hat" is worn by each actor. Each hat includes an identifying signature, such as a unique pattern of markers ("hat markers"). In another implementation, heads in the scene are identified by hand labeling three markers attached to the head. Alternatively, active markers are used to identify each head, or each hat.

In each copy of the beat, the head of the associated actor is isolated, at 940. In one implementation, isolation is accomplished by creating a sphere of about 20 inches around the labeled hat markers. All data lying outside of the sphere are assumed to be not part of the actor's head and are therefore not included. In another implementation, to isolate a body, all body points lying beyond an approximately seven foot sphere about the waist or torso of a body are not included. Isolation as described herein greatly reduces files sizes and speeds up automated labeling software.

Figure 10:
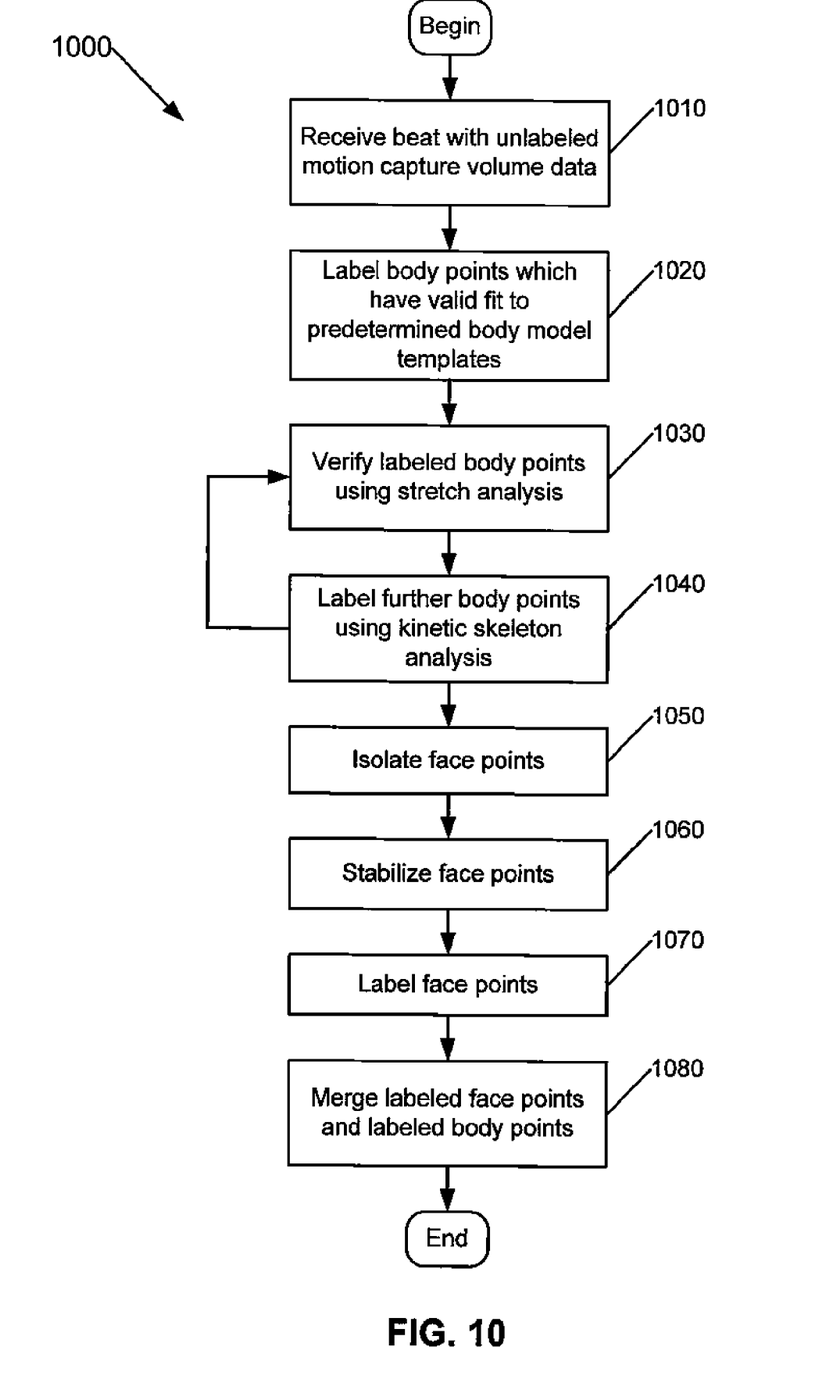
FIG. 10 is a flowchart depicting an example method of a labeling system that may be used in connection with various implementations described herein.

FIG. 10 is a flowchart illustrating a method 1000 of a motion capture labeling system 100 that may be used in connection with various implementations described herein.

An input beat including unlabeled motion capture volume data is received, at 1010. Body points which have a valid fit to a predetermined body model template are labeled, at 1020. In one implementation, initial body model templates are derived from a full ROM of actor poses at the beginning of the beat, including a $T_{pose}$.

The labeled body points are verified using stretch analysis, at 1030. Rigidity of body points with each other is determined, with body points being sorted into rigid groups. Further body point labeling is performed using a kinematic skeleton analysis, at 1040. In one implementation, skeletons are fit to labeled body points and an interpolation is performed to estimate skeleton position and velocity between frames having labeled body points. Unlabeled body points are fit to interpolated skeletons and labeled. In another implementation, a skeleton is fitted to body points representing an initial $T_{pose}$. Skeletons are estimated for the remaining frames in the beat, and hypotheses are developed as to the best fits of the unlabeled body points to the estimated skeletons. Body points are labeled in each frame according to the best scoring hypotheses.

Labeled body points are again verified using stretch analysis, at 1030. More body points are labeled using a kinematic skeleton analysis. In one implementation, verification using stretch analysis, at 1030, and further labeling using kinematic skeleton analysis, at 1040, continue until the body points are sufficiently "cleaned."

Face points are isolated, at 1050. In one implementation, face points inside of a predetermined sphere about the face are retained whereas points outside the sphere about the face points are not retained. Face points are stabilized in space, at 1060 by subtracting translational velocity from the kinematic state of each face point. Face points are labeled, at 1070. Labeled face points and labeled body points are merged, at 1080.

Various implementations may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A non-transitory computer readable medium storing a computer program for motion capture labeling, the computer program comprising:
    a body labeling module to receive a sequence of frames of motion capture volume data, and to generate labeled body data for providing identification information for points in the sequence of frames of motion capture volume data,
    said body labeling module including:
        (1) a first module configured to generate initial data of the motion capture volume data by directing an actor to perform a series of poses;
        (2) a second module configured to receive the initial data of the motion capture volume data and to determine the labeled body data by fitting the received initial data of the motion capture volume data to a predetermined body model template of the series of poses of the actor;
        (3) a third module configured to label the motion capture volume data having a valid fit to said predetermined body model template by tagging frames of the motion capture volume data having the valid fit and labeling body points in the tagged frames; and
    a relative labeling module configured to receive said motion capture volume data including said labeled body data and unlabeled face data, and to generate labeled motion capture volume data including said labeled body data and labeled face data,
    wherein labeling points on a body and face provides identification information to aid in determining motion of each point of the points in the sequence of frames and in associating the motion to the actor,
    wherein said relative labeling module further comprises:
    a face isolation module configured to isolate unlabeled face data corresponding to marker points on a face in said motion capture volume data;
    a face stabilization module configured to remove a kinematic effect including a translation velocity from said unlabeled face data;
    a labeling module configured to receive and label said unlabeled face data to generate labeled face data; and
    a merging module configured to merge said labeled face data with said labeled body data.

2. The non-transitory computer readable medium of claim 1, wherein said body labeling module further comprises a stretch analysis module configured to verify said labeled body data.

3. The non-transitory computer readable medium of claim 2, wherein said stretch analysis module is further configured to:
    determine a rigidity of a first data point of said labeled body data in relation to a second data point of said labeled body data;
    compare said rigidity to a predetermined tolerance; and
    de-label said first data point when said rigidity is outside of said predetermined tolerance.

4. The non-transitory computer readable medium of claim 1, wherein said body labeling module further comprises a kinematic skeleton module configured to:
    fit a skeleton to said labeled body data in non-adjacent frames;
    interpolate position and velocity estimates of said skeleton in intervening gap frames having unlabeled body data, said intervening gap frames located between said non-adjacent frames;
    fit said unlabeled body data in each frame of said intervening gap frames to said skeleton, said skeleton adjusted in pose according to said position and velocity estimates; and
    label said unlabeled body data fitted in each frame of said intervening gap frames to said skeleton.

5. The non-transitory computer readable medium of claim 1, wherein said body labeling module further comprises a kinematic skeleton module configured to:
    fit a skeleton to a predetermined pose in a first frame of said motion capture volume data;
    create hypotheses for a best fit of said skeleton to said motion capture volume data in each subsequent frame of said motion capture volume data; and
    label points of said motion capture volume data in said each subsequent frame according to a best hypothesis.

6. The non-transitory computer readable medium of claim 1, wherein said face isolation module is further configured to:
    remove labeled body data from said motion capture volume data;
    create a copy of said motion capture volume data corresponding to the marker points on said face; and isolate said face in said copy of said motion capture volume data by removing points of said motion capture volume data located outside of a sphere of predetermined size about said face.

7. A computer-implemented method of motion capture labeling, wherein a computer is programmed to:
receive a medium containing a motion capture beat, said motion capture beat including unlabeled body points and unlabeled face points;
generate labeled body points for providing identification information for points in the motion capture beat;
generate initial data of the motion capture beat by directing an actor to perform a series of poses;
receive the initial data of the motion capture beat;
determine the labeled body points by fitting the received initial data of the motion capture beat to a predetermined body model template of the series of poses of the actor;
create labeled body points by labeling said unlabeled body points which have a valid fit to the predetermined body model template by tagging frames of the motion capture volume data having the valid fit and labeling body points in the tagged frames, and updating the medium containing the motion capture beat with the labeled body points;
verify said labeled body points using a stretch analysis;
create additional labeled body points by labeling unlabeled body points using a kinematic skeleton analysis;
isolate said unlabeled face points corresponding to marker points on a face in said motion capture beat;
stabilize said unlabeled face points by removing a kinematic effect including a translation velocity from the unlabeled face points;
label said unlabeled face points to generate labeled face points; and
merge said labeled face points and said labeled body points.

8. The computer-implemented method of motion capture labeling of claim 7, wherein said stretch analysis includes:
determining a rigidity of a first data point of said labeled body points in relation to a second data point of said labeled body data;
comparing said rigidity to a predetermined tolerance; and
de-labeling said first data point when said rigidity is outside of said predetermined tolerance.

9. The computer-implemented method of motion capture labeling of claim 7, wherein said kinematic skeleton analysis includes:
fitting a skeleton to said labeled body points in non-adjacent frames;
interpolating position and velocity estimates of said skeleton in intervening gap frames having unlabeled body points, said intervening gap frames located between said non-adjacent frames;
fitting said unlabeled body data in each frame of said intervening gap frames to said skeleton, said skeleton adjusted according to said position and velocity estimates; and
labeling said unlabeled body points fitted in each frame of said intervening gap frames to said skeleton.

10. The computer-implemented method of motion capture labeling of claim 7, wherein said isolating includes:
removing labeled body data;
creating a beat copy corresponding with said face; and
isolating said face in said beat copy by removing points of said motion capture volume data located outside of a sphere of predetermined size about said face.

11. A non-transitory storage medium storing a computer program for motion capture labeling, the computer program comprising executable instructions that cause a computer to:
receive a motion capture beat, said motion capture beat including unlabeled body points and unlabeled face points;
generate labeled body points for providing identification information for points in the motion capture beat;
generate initial data of the motion capture beat by directing an actor to perform a series of poses;
receive the initial data of the motion capture beat;
determine the labeled body points by fitting the received initial data of the motion capture beat to a predetermined body model template of the series of poses of the actor;
create labeled body points by labeling said unlabeled body points which have a valid fit to the predetermined body model template by tagging frames of the motion capture volume data having the valid fit and labeling body points in the tagged frames;
verify said labeled body points using a stretch analysis;
create additional labeled body points by labeling unlabeled body points using a kinematic skeleton analysis;
isolate said unlabeled face points corresponding to marker points on a face in said motion capture beat;
stabilize said unlabeled face points by removing a kinematic effect including a translation velocity from the unlabeled face points;
label said unlabeled face points to generate labeled face points; and
merge said labeled face points and said labeled body points.

12. An apparatus for motion capture labeling, the apparatus comprising:
means for receiving a motion capture beat, said motion capture beat including unlabeled body points and unlabeled face points;
means for generating labeled body points for providing identification information for points in the motion capture beat;
means for generating initial data of the motion capture beat by directing an actor to perform a series of poses;
means for receiving the initial data of the motion capture beat;
means for determining the labeled body points by fitting the received initial data of the motion capture beat to a predetermined body model template of the series of poses of the actor;
means for creating labeled body points by labeling said unlabeled body points which have a valid fit to a predetermined body model template by tagging frames of the motion capture volume data having the valid fit and labeling body points in the tagged frames;
means for verifying said labeled body points using a stretch analysis;
means for creating labeled body points by labeling unlabeled body points using a kinematic skeleton analysis;
means for isolating said unlabeled face points corresponding to marker points on a face in said motion capture beat;
means for stabilizing said unlabeled face points by removing a kinematic effect including a translation velocity from the unlabeled face points;
means for labeling said unlabeled face points to generate labeled face points; and
means for merging said labeled face points and said labeled body points.

* * * * *